May 18, 1943. P. C. KEY 2,319,329
AUTOMATIC HOSE COUPLING
Filed March 26, 1942 3 Sheets-Sheet 3
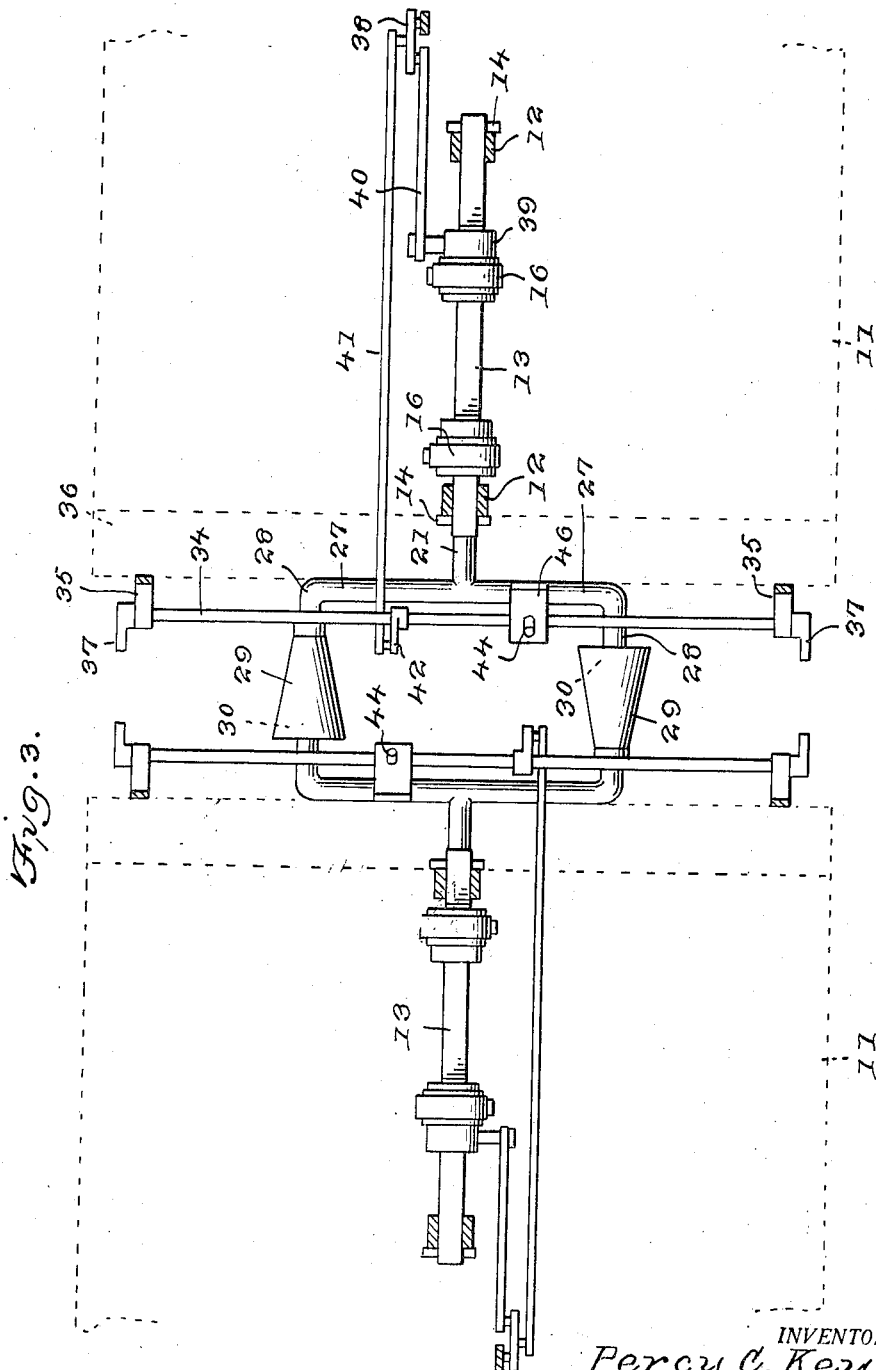
INVENTOR.
Percy C. Key
BY
Victor J. Evans & Co.
ATTORNEYS Patented May 18, 1943

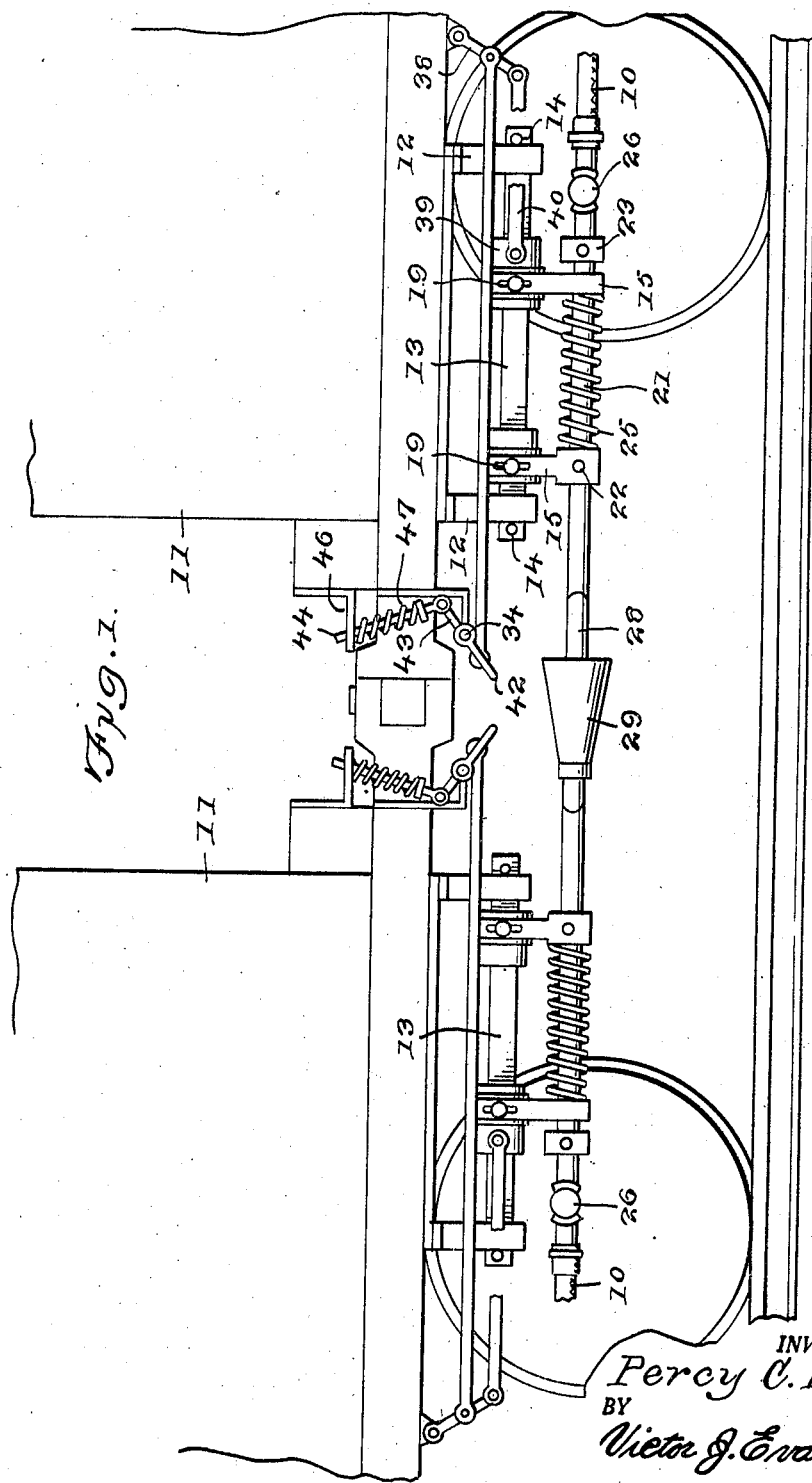

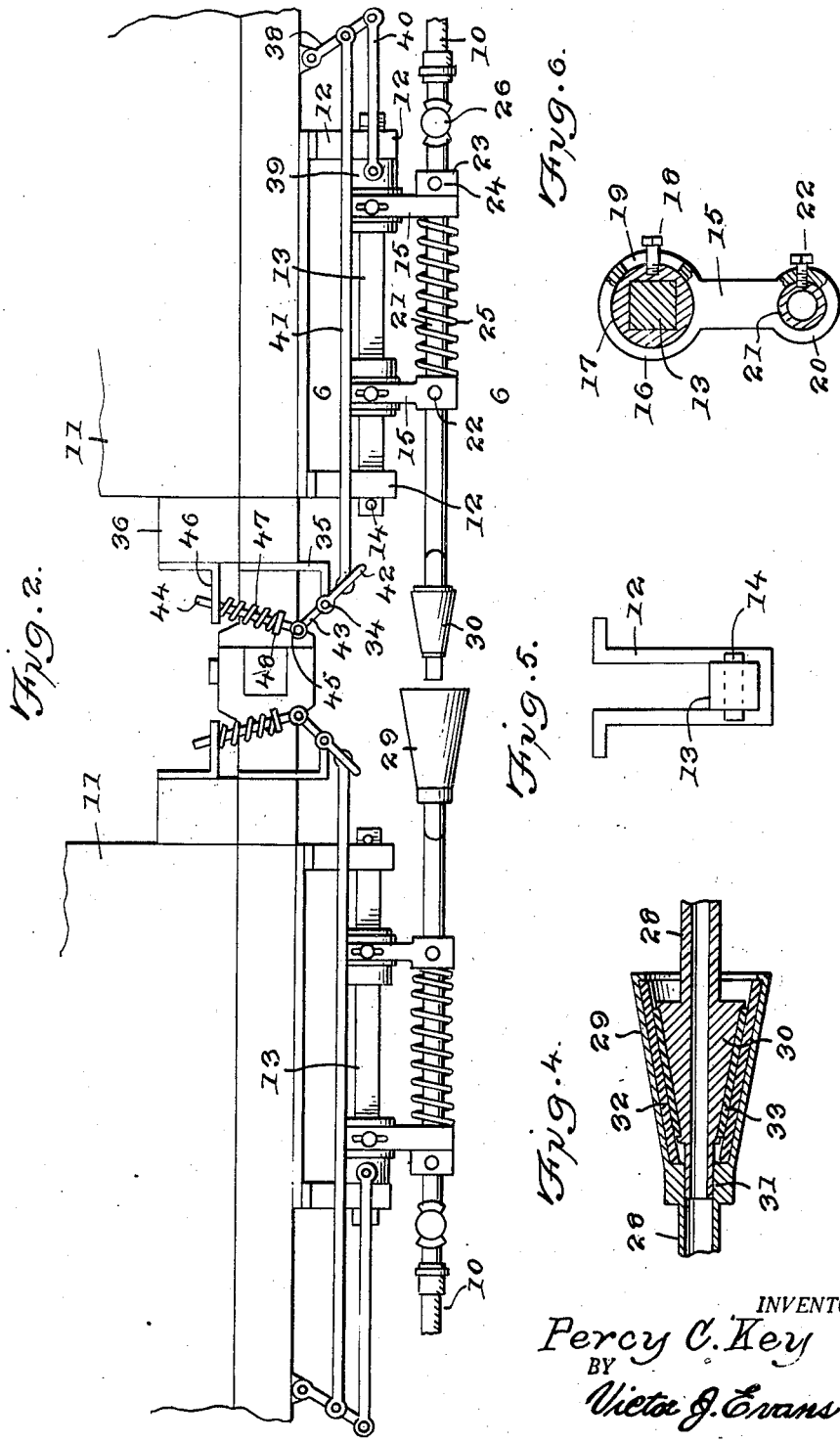

2,319,329

UNITED STATES PATENT OFFICE 2,319,329

AUTOMATIC HOSE COUPLING

Percy C. Key, College Station, Tex.

Application March 26, 1942, Serial No. 436,342

6 Claims. (Cl. 285—58)

This invention relates to an automatic hose coupling particularly adapted to coupling steam or air hose used on trains.

An object of the invention is to provide a coupling which will obviate the danger incident to going in between cars to effect coupling and uncoupling of the hose.

A further object is to provide a coupling having limited flexing movement in a vertical and lateral direction to prevent uncoupling when making a curve or traveling over uneven roads.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of an automatic hose coupling constructed in accordance with the invention, showing the cars in coupled position and the hose coupling in coupled position.

Figure 2 is a side elevation similar to Figure 1 but showing the cars and hose coupling, uncoupled.

Figure 3 is a plan view of the hose coupling in the position shown in Figure 1, with parts in section.

Figure 4 is a longitudinal sectional view showing the companion cuff and head on the opposing ends of the hose coupling.

Figure 5 is an end elevation of one of the hangers and the rod of rectangular cross section mounted for vertical movement therein.

Figure 6 is a vertical sectional view taken on the line 6—6 of Figure 2.

Referring now to the drawings in which like characters of reference designate similar parts in the various views, the automatic coupling may be used in connection with either passenger or freight cars, and by way of illustration is shown as effecting the connection of train pipes 10 on adjacent freight cars 11.

Depending from the bottom of each car are spaced U-shaped hangers 12, see Figure 5, the hangers being bolted or otherwise rigidly secured to the bottom of the car. A rod 13 of rectangular cross section, is carried by the hangers for vertical movement with relation thereto, the rod being provided with transverse pins 14 at the ends engaging the hangers to prevent endwise movement of the rod in the hangers.

A pair of arms 15 extend downwardly from the rod 13. As best shown in Figure 6 the upper end of each arm is formed with a sleeve 16 which is mounted on a collar 17 which is provided with a rectangular opening to loosely receive the rod 13. A set screw 18, engaged through a slot 19 in the sleeve 16 and threaded into the collar 17, permits limited oscillating movement of the arm 15 on the rod 13 while the arm may slide longitudinally of the rod 13. The lower end of each arm 15 is formed with a sleeve 20 and a pipe 21 is engaged through the sleeves of both arms. The sleeve of one arm is pinned to the pipe by a set screw 22 while the sleeve of the other arm is loose on the pipe. In rear of the sleeve of said other arm a collar 23 is pinned to the pipe by a set screw 24. A helical spring 25 is sleeved on the pipe between both arms. In rear of the collar 23 the train pipe 10 is provided with a conventional coupling 26 which connects the train pipe to the pipe 21.

The pipe 21 is provided with lateral branches 27 at the forward end these branches terminating in forwardly extending branches 28, see Figure 3, one of which is equipped with a conical cuff 29 and the other of which is equipped with a conical head 30 through which the branch pipe 28 projects for a short distance, see Figure 4. The branch 28 is continued through the head to provide a short projecting pipe 31 which enters the companion pipe 28 when the head enters the cuff of the latter as shown in Figure 4. A rubber lining 32 is disposed within the cuff 29 and a rubber facing 33 is disposed on the conical head 30 to provide a steam or air tight connection between these parts.

For moving the pipe 21 and its coupling elements 29 and 30 into operative or inoperative position with respect to the companion coupling elements of the adjacent car, a shaft 34 is rotatably mounted in bearings 35 disposed on the end beam 36 of the car, and handles 37 are secured to the ends of the shaft. A lever 38 is pivotally secured at the upper end to the bottom of the car and at the lower end is pivotally connected to a collar 39 slideably mounted on the rod 13, by a link 40. A second link 41 is pivotally connected to the lever 38 at a point intermediate the ends of the lever and the forward end of the link 41 is connected to a crank arm 42, at the lower end of the latter. The crank arm 42 is secured to the manually operable shaft 34.

When the shaft 34 is turned in one direction the collar 39 will be moved forwardly and carry the adjacent arm 15 forwardly, see Figure 2, so that pressure is exerted on the spring 25 and the spring thus be moved forwardly on the pipe 21 with the result that the forward arm 15, which is pinned to the pipe at 22, will be moved forwardly, and carry the pipe forwardly to engage the conical head 30 with the companion conical cuff 29 of the adjacent car. A latching mechanism connected to the shaft 34 maintains this operative position, as will presently be described. When the manually operable shaft 34 is turned in the opposite direction the collar 39 will be moved rearwardly from the position shown in Figure 1 to the position shown in Figure 2 so that the adjacent arm 15 will be moved by the spring 25 to engage the heretofore mentioned stop collar 23, which is pinned to the screw 24 to carry the pipe 21 rearwardly as a unit with the forward arm 15 and uncouple the coupling elements 29 and 30.

The latching mechanism before mentioned is in the nature of a snap action lever mechanism spring controlled to remain in either of its off center positions as will be now described. As shown in Figure 2 the latch mechanism comprises a pair of levers 43 and 44 pivotally connected at their inner ends as shown at 45, the lower lever being connected to the shaft 34 to be swung by rotation of the shaft while the upper lever is slideably and pivotally engaged in an elongated opening formed in a bracket arm 46 which is secured to the end beam 36 of the car. A spring 47 is sleeved on the upper lever 44 between the bracket 46 and a stop collar 48 on the lever. Movement of the shaft 34 will swing the upper lever to either of its two off center positions and the lever will be held in such position by the spring 47, as will be understood, to maintain the coupled or uncoupled position of the coupled elements 29 and 30.

From the above description it is thought that the construction and operation of the invention will be fully understood without further explanation.

What is claimed is:

1. The combination with a car of spaced front and rear hangers secured to the bottom of the car, a horizontal rod of rectangular cross section mounted in the hangers for vertical movement, spaced arms mounted for sliding movement longitudinally on the rod, means permitting limited lateral oscillating movement of the arms on the rod, a pipe carried by the lower ends of the arms, one of the arms being fixed to the pipe and the other arm slideably engaging the pipe, a spring sleeved on the pipe between the arms, the pipe having branches at the forward end, means for coupling the rear end of the pipe to a train pipe, coupling members on the branches including a conical head on one branch and a conical cuff on the other branch adapted to engage respectively a companion conical cuff and a companion conical head when the pipe is moved to operative position, operating means connected to the arm which slideably engages the pipe for compressing the spring against the arm which is fixed to the pipe to move the pipe endwise into operative position, said spring being adapted to move the arm which slideably engages the pipe against a stop on the pipe to return the pipe to inoperative position upon release of said operating means, and latch means connected to the operating means for holding the pipe in operation or in inoperative position.

2. The structure as of claim 1 and in which the means for permitting limited lateral oscillating movement of the arms comprises a bearing collar slideably mounted on the rod, a sleeve on the upper end of the arm mounted to turn on the bearing collar, said sleeve having a circumferential slot, and a set screw engaged in the bearing collar and projecting through said slot.

3. The structure as of claim 1 and in which the operating means comprises a collar slideably mounted on the rod engaging the arm which is slideably engaged with the pipe, motion transmitting levers and connecting links operatively connected to the collar for sliding the collar, a manually operable shaft disposed transversely of the car terminating in handles at the ends thereof, and a crank arm carried by the shaft connected to said motion transmitting levers and connecting links.

4. The structure as of claim 1 and in which the latch means comprises levers pivotally connected together and connected to the car and to the manually operable shaft for off center movement on each side of the vertical plane, and a spring carried by one of the levers for yieldably holding the levers in either of the two off center positions.

5. The combination with a car, of two spaced hangers secured to the bottom of the car, a horizontal rod mounted in the hangers for vertical movement, spaced arms mounted for sliding and oscillating movement on the rod, a pipe carried by the lower ends of the arms, one of the arms being fixed to the pipe and the other arm slidably engaging the pipe, a spring sleeve on the pipe between the arms, a coupling carried by the outer end of the pipe for connection with a train pipe, operating means connected to the arm slidably mounted on the pipe for compressing the spring against the fixed arm to move the pipe endwise into operative position, said spring adapted to move the arm which is slidable against a stop on the pipe to return the same to operative position upon release of said operating means, and latch means connected to the operating means for holding the pipe in coupled or uncoupled positions.

6. The combination with a car, of two spaced hangers secured to the bottom of the car, a horizontal rod mounted in the hangers for vertical movement and held against rotation, spaced arms mounted for sliding and oscillating movement on the rod, a pipe carried by the lower end of the arms, one of the arms being fixed to the pipe and the other arm slidably engaging the pipe, a spring sleeve on the pipe between the arms, a coupling carried by the outer end of the pipe for connection with a train pipe, operating means connected to the arm slidably mounted on the pipe for compressing the spring against the fixed arm for moving the pipe endwise into operative position, said spring adapted to move the arm which is slidable against the stop on the pipe to return the same to operative position upon release of said operating means, and a pivoted snap latch connected to the operating means for holding the pipe in coupled or uncoupled positions.

PERCY C. KEY.